US010666571B2

(12) United States Patent
Zhou et al.

(10) Patent No.: US 10,666,571 B2
(45) Date of Patent: May 26, 2020

(54) METHOD AND APPARATUS FOR PROVIDING ACCESS OF CONTENT RESOURCES

(71) Applicant: EMC IP HOLDING COMPANY LLC, Hopkinton, MA (US)

(72) Inventors: Wei William Zhou, Shanghai (CN); Jason Muhua Chen, Shanghai (CN); Wei Ruan, Shanghai (CN); Chen Wang, Shanghai (CN); Zed Minhong Zhou, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 234 days.

(21) Appl. No.: 15/375,303

(22) Filed: Dec. 12, 2016

(65) Prior Publication Data

US 2017/0171104 A1 Jun. 15, 2017

(30) Foreign Application Priority Data

Dec. 14, 2015 (CN) .......................... 2015 1 0929192

(51) Int. Cl.
*G06F 15/173* (2006.01)
*H04L 12/911* (2013.01)
*H04L 29/12* (2006.01)
*H04L 29/08* (2006.01)

(52) U.S. Cl.
CPC .......... *H04L 47/78* (2013.01); *H04L 61/3085* (2013.01); *H04L 67/02* (2013.01)

(58) Field of Classification Search
CPC . H04L 47/786; H04L 61/3085; H04L 63/102; H04L 63/20
See application file for complete search history.

(56) References Cited

U.S. PATENT DOCUMENTS

| 9,154,296 | B1 | 10/2015 | O'Connell | |
|---|---|---|---|---|
| 9,432,484 | B1 | 8/2016 | Xie et al. | |
| 2014/0324724 | A1* | 10/2014 | Zimberoff | ............. G06Q 10/08 705/330 |
| 2015/0095343 | A1* | 4/2015 | Divilly | .................... H04L 67/28 707/741 |
| 2016/0294900 | A1* | 10/2016 | Agrawal | ............. H04L 65/4076 |
| 2017/0171125 | A1* | 6/2017 | Chow | .................... H04L 67/06 |

FOREIGN PATENT DOCUMENTS

| CN | 101005485 | 7/2007 |
|---|---|---|
| CN | 101047664 | 10/2007 |
| CN | 101553043 | 10/2009 |

* cited by examiner

*Primary Examiner* — Yves Dalencourt
(74) *Attorney, Agent, or Firm* — BainwoodHuang

(57) ABSTRACT

A method and apparatus for providing access to content resources are provided. The method comprises: in response to receiving a first request for accessing first content resources in a content server, obtaining from the content server metadata associated with a first Uniform Resource Identifier (URI) of the first content resources, the first request including the first URI, the metadata at least indicating a mapping between the first URI of the first content resources and a second URI of the first content resources, the first URI being a shortened version of the second URI; obtaining the second URI by parsing the metadata; and responding to the first request with the second URI of the first content resources.

16 Claims, 6 Drawing Sheets

400

```
{
    "type": "document",
    "definition": "http://example.com/s/1c36dh8",
    "properties": {
        "object-name": "ReleaseNotes.pdf",
        "object-type": "document",
        "title": "Release notes for Enterprise Content Services",
        "subject": "Bedrock",
        "authors": ["Jim", "Tina"],
        "keywords": ["cloud", "big data"],
        "creation-date": "2015-03-06T02:10:09.000-00:00",
        "modify-date": "2015-03-06T02:10:09.000-00:00",
        "modifier": "Jim",
        "access-date": "2015-08-15T04:24:07.000-00:00",
        "is-virtual-doc": false,
        "content-type": "pdf",
        "content-size": 4303653,
        "full-text": true,
        "storage-type": "filestore-01",
        "version-label": ["1.0", "CURRENT"],
        "branch-cnt": 0,
        "direct-dsc": false,
        "immutable-flag": false,
        "frozen-flag": false,
        "is-signed": false,
        "partition": 0,
        "is-replica": false,
        "vstamp": 15,
    },
    "_links": [
        {"self", "http://example.com/s/91fy3m"},
        {"edit", "http://example.com/s/91fy3m"},
        {"parent", "http://example.com/s/84z05f"},
        {"contents", "http://example.com/s/53x63r"},
        {"version-history", "http://example.com/s/3m987a"},
        {"lifecycle", "http://example.com/s/0b8sa1"}
    ]
}
```

Fig. 4

METHOD AND APPARATUS FOR PROVIDING ACCESS OF CONTENT RESOURCES

RELATED APPLICATIONS

This application claim priority from Chinese Patent Application Number CN201510929192.9, filed on Dec. 14, 2015 at the State Intellectual Property Office, China, titled "METHOD AND APPARATUS FOR PROVIDING ACCESS OF CONTENT RESOURCES," the contents of which is herein incorporated by reference in its entirety

FIELD

Embodiments of the present disclosure relate to access to content resources, and more particularly, to a method and apparatus for providing access to content resources under, for example, the Representational State Transfer (REST) architecture.

BACKGROUND

REST is a software architecture style. An Application Programming Interface (API) accessing an application or service following the REST style (RESTful) is called RESTful API or REST API. With the Software as a Service (SaaS) arising in the enterprise data systems, more and more vendors are exposing REST APIs to client applications. The resources in a REST API are uniquely identified by Uniform Resource Identifies (URIs). By providing URN to a client, a Web server makes it possible for the client to access resources at the URI.

The general syntax format of conventional URIs is protocol :// hostname[:port]/path, wherein "protocol" specifies a transport protocol that is used for accessing resources, "hostname" is also called "domain name" which represents the name of a server storing resources, "port" is optional and represents the port number of the transport protocol, and "path" represents the name of a path arriving at resources and of the resources themselves. However, conventional URIs have a variety of limitations. For example, conventional URIs typically include a plurality of characters. For example, the URI http://example.com/tenants/1b523c/spaces/02c6d/folders/9843a2f/docs/837b8 includes 73 characters. Applications like mobile phone applications are very sensitive to the payload size, and some message transceiver systems (such as short message service (SMS), microblogging service, etc.) limit the number of characters that can be transferred in messages. In addition, as seen from the general syntax format of conventional URIs, conventional URIs include confidential information which may be abused by malicious clients. For example, a conventional URI reflects the organization pattern of resources in a server to which the URI points, and a malicious client may illegally access other resources with the pattern.

SUMMARY

To solve one or more problems in prior art, there is a need for a technical solution for providing access to resources with shortened URIs. According to embodiments of the present disclosure, there is proposed a technical solution for providing URI shortening service within a secure network environment formed by a Web server and a content server.

In a first aspect, there is provided a method for providing access to content resources. The method comprises: in response to receiving a first request for accessing first content resources in a content server, obtaining from the content server metadata associated with a first Uniform Resource Identifier (URI) of the first content resources, the first request including the first URI, the metadata at least indicating a mapping between the first URI of the first content resources and a second URI of the first content resources, the first URI being a shortened version of the second URI; obtaining the second URI by parsing the metadata; and responding to the first request with the second URI of the first content resources.

In some embodiments, the second URI has the same domain name as the first URI.

In some embodiments, the method further comprises: before receiving the first request, receiving a second request for accessing the first content resources, the second request including the second URI; and generating the metadata associated with the first URI by creating the mapping between the first URI and the second URI.

In some embodiments, the second request includes header information, and wherein the generating the metadata associated with the first URI comprises: extracting the header information from the second request; and including the header information in the metadata.

In some embodiments, the responding to the first request with the second URI of the first content resources comprises: identifying the first content resources by parsing the second URI; identifying a data object associated with the first content resources; and obtaining the data object from the content server.

In some embodiments, the responding to the first request with the second URI of the first content resources further comprises: determining second content resources associated with the first content resources by parsing the data object; identifying link relation between the first content resources and the second content resources; generating a first URI of the second content resources based on the link relation; and determining a second URI of the second content resources based on the first URI of the second content resources, the second URI of the second content resources being a shortened version of the first URI of the second content resources.

In some embodiments, the determining the second URI of the second content resources comprises: making a query, with the first URI of the second content resources, to the content server for the second URI of the second content resource.

In some embodiments, the determining the second URI of the second content resources further comprises: obtaining the second URI of the second content resources from the content server if there is the second URI of the second content resources in the content server.

In some embodiments, the determining the second URI of the second content resources further comprises: creating a mapping between the first URI of the second, content resources and the second URI of the second content resources if there is not the second URI of the second content resources in the content server; and generating metadata associated with the second URI of the second content resources based on the mapping between the first URI of the second content resources and the second URI of the second content resources.

In some embodiments, the responding to the first request with the second URI of the first content resources further comprises: constructing a response to the first request by adding to the data object the first URI of the first content resources and the second URI of the second content resources.

In some embodiments, the method is implemented by a Web server.

In a second aspect, there is provided an apparatus for providing access to content resources. The apparatus comprises: an interacting unit configured to obtain, in response to receiving a first request for accessing first content resources in a content server, from the content server metadata associated with a first Uniform Resource identifier (URI) of the first content resources, the first request including the first URI, the metadata at least indicating a mapping between the first URI of the first content resources and a second URI of the first content resources, the first URI being a shortened version of the second URI; a parsing unit configured to obtain the second URI by parsing the metadata; and a responding unit configured to respond to the first request with the second URI of the first content resources.

In a third aspect, there is provided a server. The server comprises: at least one processing unit; and a memory coupled to the at least one processing unit and storing instructions thereon, the instructions, when executed by the at least one processing unit, performing the method according to the embodiments of the present disclosure.

In a fourth aspect, there is provided a computer program product. The computer program product is tangibly stored on a non-transient machine-readable medium and comprises machine-executable instructions, the instructions, when executed on a device, causing the device to execute the method according to the embodiments of the present disclosure.

According to the embodiments of the present disclosure, the URI shortening service is provided within a secure network environment formed by a Web server and a content server, instead of relying on a HTTP redirect mechanism. Therefore, a method according to the embodiments of the present disclosure can support all access modes to content resources, for example, including but not limited to, PUT, POST, DELETE, etc. In addition, the URI shortening service is provided within a secure network environment formed by a Web server and a content server, sharing resources across domain can be avoided. Therefore, the security and efficiency of resource access is increased and user experience improved.

BRIEF DESCRIPTION OF THE DRAWINGS

Through the detailed description of some embodiments of the present disclosure in the accompanying drawings, the features, advantages and other aspects of the present disclosure will become more apparent, wherein several embodiments of the present disclosure are shown for the illustration purpose only, rather than for limiting. In the accompanying drawings:

FIG. 4 shows an exemplary response to a content resource request;

DETAILED DESCRIPTION

Principles of the present disclosure are described below by means of several exemplary embodiments as shown in the accompanying drawings. It should be understood that these embodiments are described only for enabling those skilled in the art to better understand and further implement the present disclosure, rather for limiting the scope of the present disclosure in any manner.

Figure 1:
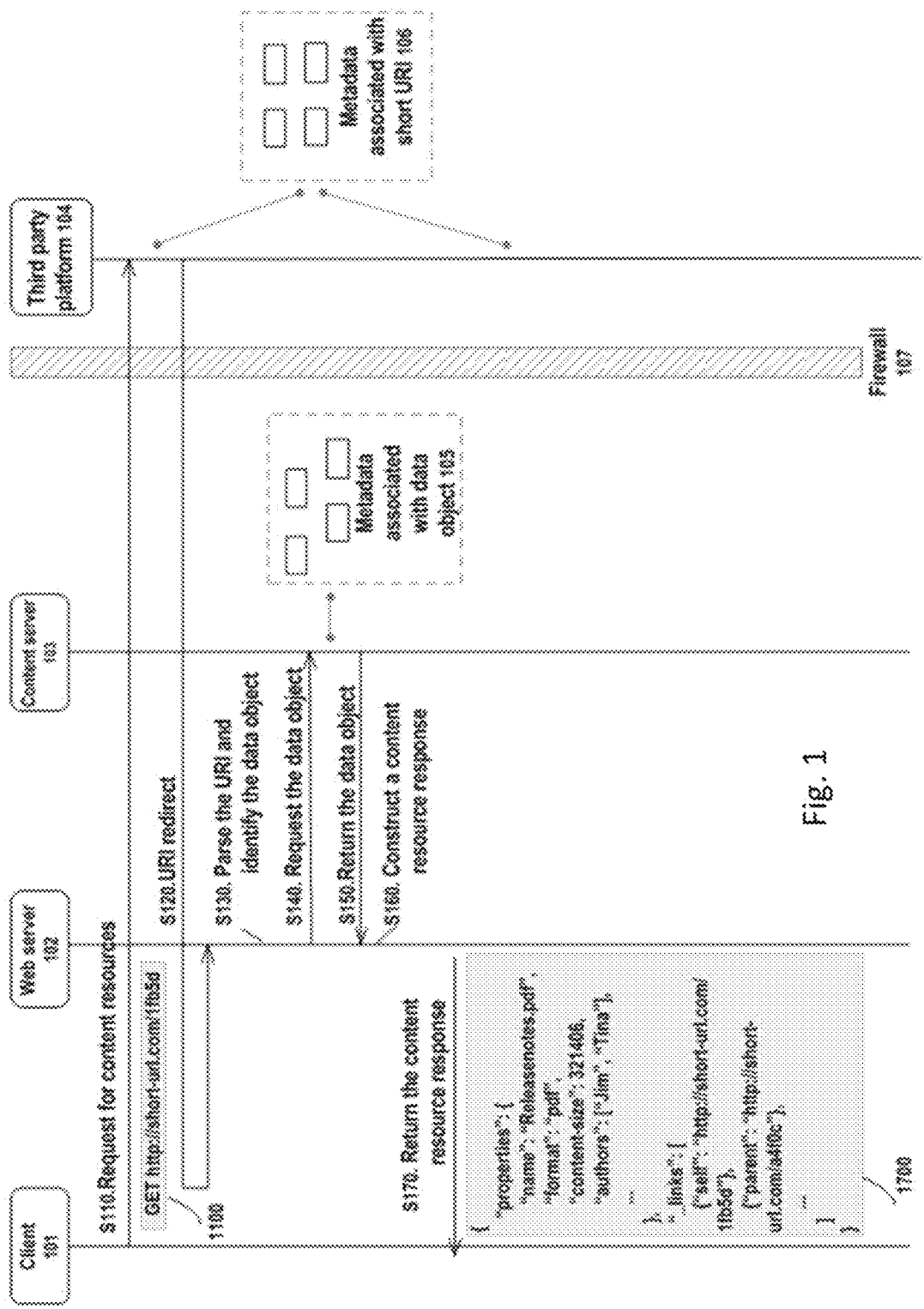
FIG. 1 shows a flow of a method for providing access to resources by means of URI so shortening service provided by a URI shortening service platform.

As described above, conventional URIs are used for uniquely identifying content resources stored in a content server. By providing conventional URIs to a client, a Web server makes it possible for the client to access resources in a content server. Since conventional URIs typically include a large amount of characters, sometimes conventional URIs are also called "long URIs". In addition, since long URIs have several limitations, URI shortening service transforming long URIs to "shorten URIs" with less characters are gradually promoted. At present, there are a plurality of URI shortening service platforms provided by third parties, such as http://shorturl.com/, http://goo.gl/, https://bitly.com/, http://tinyurl.com/ and so on. With reference to FIG. 1, description is presented below to a method 100 for providing access to resources using URI shortening service provided by a URI shortening service platform.

Method 100 relates to interactions among a client 101 (e.g., a Web browser), a Web server 102, a content server 103 and a third party URI shortening service platform 104 (called "third party platform 104" for short).

Content server 103 may be configured to store data (not shown) of data objects corresponding to content resources, and metadata 105 associated with data objects.

Web server 102 may be configured to uniquely identify content resources stored in the content server with long URIs. Web server 102 may be, for example, a REST server adopting the REST architecture. In the REST architecture, an HTTP method is used to represent operations performed to content resources, such as GET, PUT, POST, and DELETE.

Third party platform 104 may be configured to provide URI shortening service. In particular, third party platform 104 provides short URI registration service and, stores metadata 106 associated with short URIs. Metadata 106 at least includes mapping between a long URI and a corresponding short URI.

In method 100, assuming that a user has obtained a short URI, for example, "http://shorturl.com/1fb5d", corresponding to a long URI of content resources to be accessed, wherein "shorturl.com" is a domain name of the short URI, and "1fb5d" is an identifier (ID) of the short URI. For example, the user may obtain the short URI via email, web page, etc.

After obtaining the short URI, the user may send a request for accessing content resources to third party platform 104 via client 101 (as shown by S110), for example, a GET request 1100 in the form of "GET http://shorturl.com/1fb5d".

In S120, third party platform 104 may parse the received GET request to get the short URI, locally query a long URI corresponding to the short URI, and send to client 101 a response including the long URI so as to indicate client 101 to redirect to the long URI. After receiving the response client 101 extracts the long URI therefrom and uses the long URI to reseed to Web server 102 a request for accessing content resources.

In S130, Web server 102 parses the long URI and identifies the identified content resource. It may be understood that in Web service (e.g., REST service), data objects are abstracted as resources. Therefore, the identifying a content resource identified by the long URI comprises identifying a data object to which the resource corresponds. In S140, Web server 102 requests the identified data object to content server 103. In S150, content server 103 returns the requested data object to Web server 102.

In S160, Web server 102 constructs a response to the content resource request based on the received data object. In S170, Web server 102 returns response 1700 to the content resource request to client 101.

As seen from the foregoing description, in method 100, the URI shortening service is provided by third party platform 104, and the URI shortening service relies on the HTTP redirect mechanism (as shown by S120). However, the HTTP redirect mechanism only supports the GET method but does not support POST, PUT and DELETE methods. In other words, if client 101 issues a POST, PUT or DELETE request to third party platform 104, third party platform 104 fails to enable client 101 to perform URI redirect.

In addition, it may be understood that Web server 102 and content server 103 are located in the same domain, and they communicate through a reliable network channel (e.g., a local area network). However, third party platform 104 is located in a different domain from Web server 102 and content server 103. Typically, network channels between different domains are unreliable, and thus firewalls (e.g., a firewall 107 as shown in FIG. 1) have to be arranged between different domains so as to ensure information security within each domain. Therefore, accessing third party platform 104 across domain (i,e., across firewall) will bring potential security dangers. In addition, accessing third party platform 104 across domain will bring network latency, thus affecting user experience.

In addition, POST and PUT requests further carry payload besides URIs. For the security consideration, the user does not want third party platform 104 to get information in the payload.

Moreover, since third party platform 104 maintains mapping between a long URI and a corresponding short URI and the long URI includes information associated with content server 103, third party platform 104 may retrieve the information for analysis. Nevertheless, this is not desired by the provider of content server 103.

In view of the foregoing problems, there is a need for a technical solution for providing URI shortening service within a secure network environment formed by a Web server and a content server.

Figure 2:
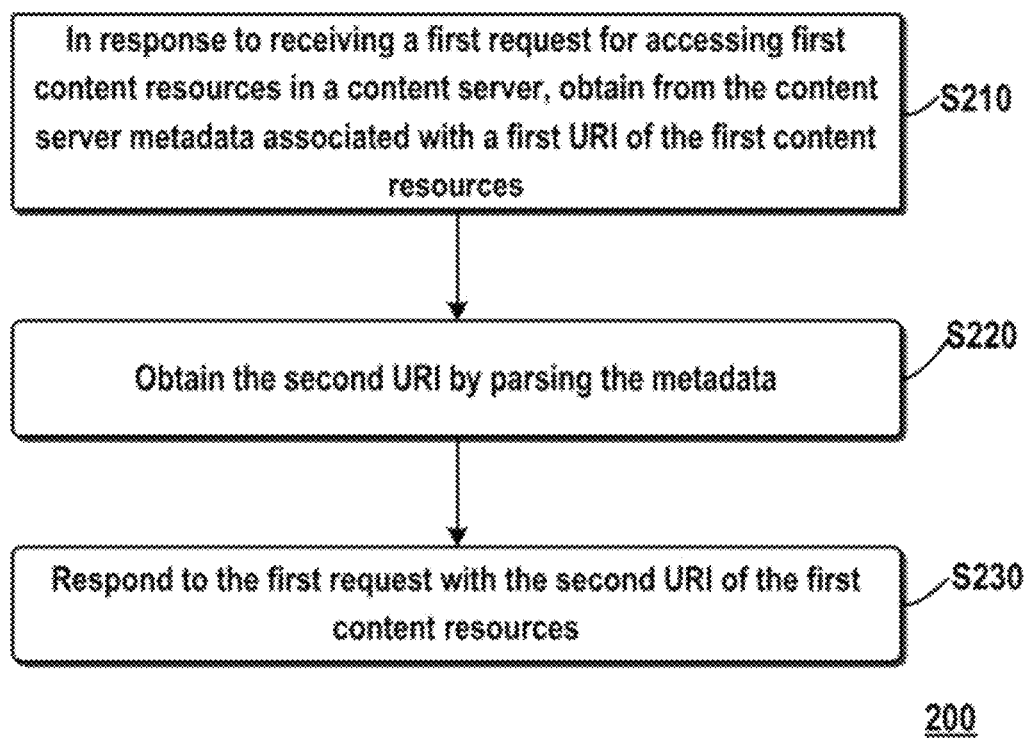
FIG. 2 shows a flowchart of a method for providing access to content resources in a content server according to one embodiment of the present disclosure.

FIG. 2 shows a flowchart of a method 200 for providing access to content resources in a content server according to an embodiment of the present disclosure. In some embodiments, method 200 may be implemented in a computing device used for providing access to content resources in the content server. The computing device may include, but not limited to a Web server, an application server or any other appropriate type of server. Where a Web server is adopted, the Web server may be, for example, a REST server adopting REST architecture. In the REST architecture, HTTP methods are used to represent operations performed to content resources, such as GET, PUT, POST and DELETE.

As shown in FIG. 2, in S210, in response to receiving a first request for accessing first content resources in a content server, a Web server communicates with the content server to obtain metadata associated with a first URI of the first content resources in the content server. The first request includes the first URI. The metadata at least indicates a mapping between the first URI of the first content resources and a second URI of the first content resources. The first URI is a shortened version of the second URI. In some embodiments, the second URI has the same domain as the first URI, and the character length of the second URI is longer than that of the first URI. In S220, the Web server parses the metadata to obtain the second URI. In S230, the Web server responds to the first request with the second. URI of the first content resources.

It should be understood throughout the context of this disclosure, the "first URI" is also called "short URI", and they may be used interchangeably. Similarly, the "second URI" is also called "conventional URI", "original URI", or "long URI", and they may be used interchangeably.

According to the embodiment of the present disclosure, URI shortening service is provided within a secure network environment formed by a Web server and a content server. In the URI shortening service, a long URI and its corresponding short URI have the same domain name and thus point to the same Web server. In other words, a long URI and its corresponding short URI are both created by the Web server. In addition, the Web server is configured as not only the creator of the short URI but also a consumer (also called "user") of the short URI, while the content server is configured to maintain metadata associated with the short URI, the metadata at least indicating a mapping between the short URI and the long URI. The Web server obtains the metadata from the content server and parses the metadata to obtain the long URI corresponding to the short URI. Since the long URI itself is created by the Web server, the Web server understands meanings of the longer URI. Therefore, the content resources may be identified using the long URI at the Web server locally, instead of relying on the HTTP redirect mechanism like the third party URI shortening service platform. Therefore, the embodiment according to the present disclosure can support all access methods to content resources, for example, including without limitation to, PUT, POST, DELETE, etc.

In addition, according to the embodiment of the present disclosure, since the URI shortening service is provided within a secure network environment formed by a Web server and a content server, resource sharing across domain can be avoided. Therefore, the security and efficiency of resource access is increased, and user experience is improved.

Moreover, according to the embodiment of the present disclosure, the content server maintains metadata associated with a short URI, which at least indicates a mapping between the short URI and its corresponding long URI. In other words, metadata associated with short URIs is private to the content server, thereby avoiding leaks of information associated with the content server.

Figure 3:
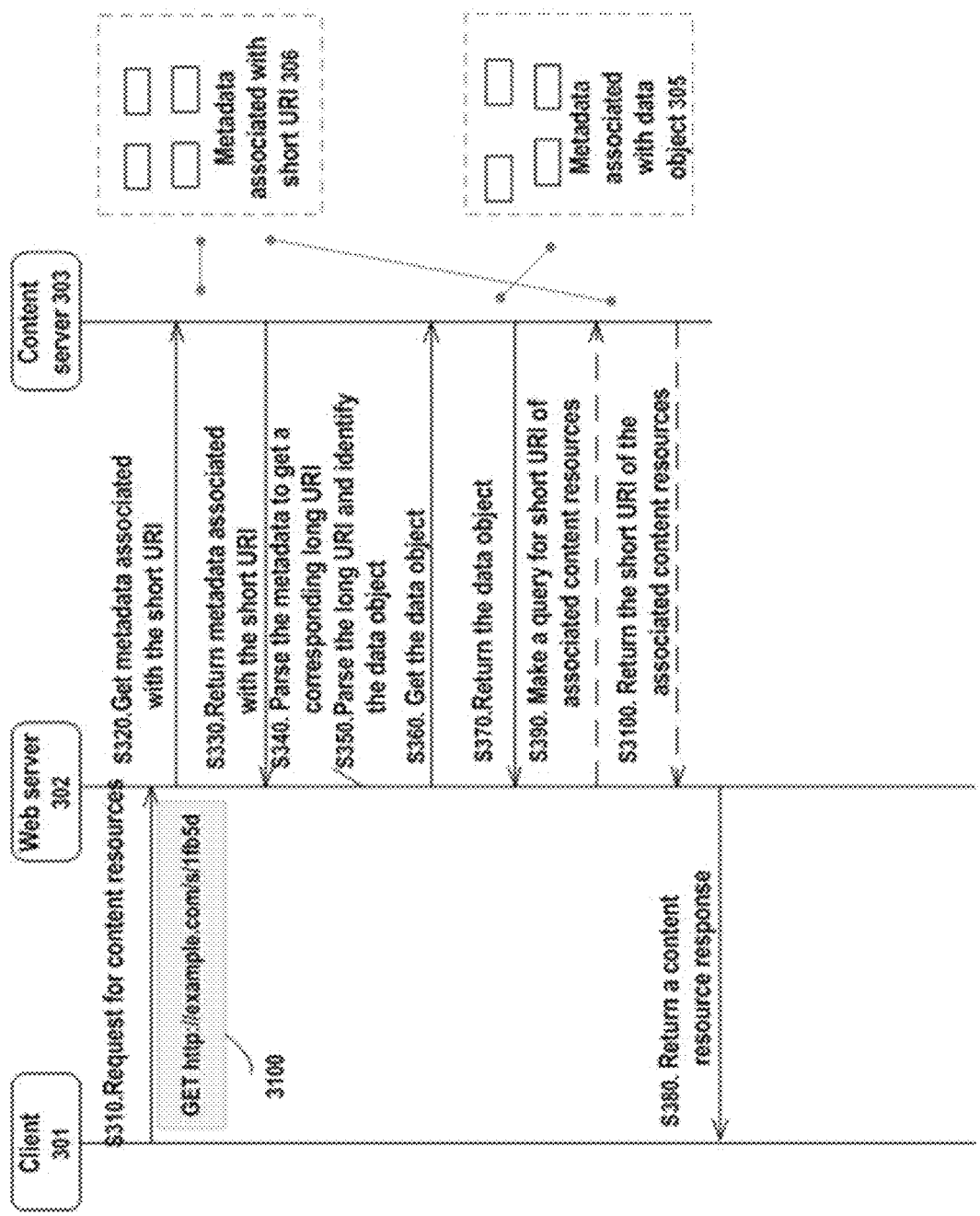
FIG. 3 shows a flow of a method for providing access to content resources according to another embodiment of the present disclosure.

With reference to FIG. 3, description is presented below to a flow of a method 300 for providing access to content resources according to another embodiment of the present disclosure.

According to the embodiment of the present disclosure, URI shortening service is provided within a secure network environment formed by a Web server 302 and a content server 303. In the URI shortening service, Web server 302 is configured to be a creator and consumer (also called "user")

of short URIs, while content server 303 is configured to maintain metadata associated with short URIs.

In particular, to create short URIs corresponding to long URIs at Web server 302, a short URI data dictionary (also called "data type") "shorten_uri" may be predefined to hold metadata associated with short URIs. As one example, the short URI data dictionary "shorten_uri" at least includes three attributes, listed as below;

object-id
    data type: string
    modifier: system generated; read-only
    description: unique identity of a short URI instance in the content server
original-uri
    a data type: string
    modifier: write on creation
    description: the URI where the short URI is mapped from
shorten-uri
    data type: string
    modifier: write on creation
    description: the URI where the original URI is mapped to In addition, the short URI data dictionary "shorten_uri" may optionally include one or more of the following attributes:

creator
    data type: string
    modifier: system generated; read-only
    description: the creator of the short URI
creation-date
    data type: date
    modifier: system generated; read-only
    description: the creation date of the short URI
expiration-date
    data type: date
    modifier: write on creation
    description: the expiration date of the short URI: it cannot be earlier than the creation date of the short URI. When the access time is later than the expiration date, the short URI expires.
last-access-date
    data type: date
    modifier: system generated; read-only
    description: the last access date of the short URI; the value is refreshed each time the short URI is obtained from the content server.
access-count
    data type: integer
    modifier: system generated; read-only
    description: the total access amount of the short URI
one-time-use
    data type: Boolean
    modifier: write on creation
    description: flag for one time access use; "true" indicates that the short URI is for one-time use: "false" indicates that the short URI is for repeated use; defaults to "true". When the value is "true" and the other attribute "access-count" is no less than 1, the short URI becomes invalid
forbidden-accessors
    data type: repeating string
    modifier: write on creation
    description: list of users that are NOT allowed to read the short URI; "empty" means no forbidden accessors
exclusive-accessors
    data type: repeating string
    modifier: write on creation
    description: only specified users in the list are allowed to read the short URI; "empty" means no limitation on user access.
http-header-names
    data type: repeating string
    modifier: write on creation
    description: list of names of HTTP headers associated with the original URI
http-header-values
    data type: repeating string
    modifier: write on creation
    description: list of values of HTTP headers associated with the original URI It may be understood that with the attributes "expiration-date" and "one-time-user", Web server 302 can control the lifetime of the created short URI.

Additionally, it may be understood although the user access to the short URI may be controlled by defining the attributes "forbidden-accessors" and "exclusive-accessors" at Web server 302 side. Where attributes like "forbidden-accessors" are not relied on, content server 303 still can use its own Access Control List (ACL) model to further manage the short URI instance, for example, granting a user's read permission on the short URI instance, revoking another user's read permission on the short URI instance, etc.

In addition, it may be understood Web server 302 (e.g., applications on Web server 302) may create short URIs, corresponding to long URIs, by an API based on the short URI data dictionary "shorten_uri" defined as above. The API may use any appropriate known algorithm, such as Java, .NET, etc. Therefore, detailed description of the known algorithm is omitted in this disclosure.

Furthermore, Web server 302 (e.g., applications on Web server 302) may consume (i.e., use) created short URIs by APIs. To this end, the embodiment of the present disclosure defines a short URI Data Transfer Object and a set of relevant API methods so as to enable Web server 302 to consume created short URIs. For example, Web server 302 may consume the API through Java, .NET, SOAP Web Services or RESTful Services, etc.

Specifically, the "short URI Data Transfer Object" is used for the interaction between Web server 302 and content server 303. As one example, the short URI Data Transfer Object "ShortenUri" may be defined as below:

ShortenUri
    originalUri
        string; map to original-uri; provided by caller of short URI Data Transfer Object "ShortenUri"
    shortenUri
        string; map to shorten-uri; provided by receiver of short URI Data Transfer Object "ShortenUri"
    expirationDate
        date; map to expiration-date; provided by caller of short URI Data Transfer Object "ShortenUri"
    oneTimeUse
        boolean; map to one-time-access: provided by caller of short URI Data Transfer Object "ShortenUri"
    forbiddenAccessors
        List<String>; map to forbidden-accessors; provided by caller of short URI Data Transfer Object "ShortenUri"
    exclusiveAccessors
        List<String>; map to exclusive-accessors; provided by caller of short URI Data Transfer Object "ShortenUri"

httpHeaders
    Map<String, String[ ]>: map to http-header-names and http-header-values; provided by caller of short URI Data Transfer Object "ShortenUri"
others
    Map<String, Object>; Stakeholder for other attributes optional.

It may be understood that like the short URI data dictionary "shorten_uri", the short URI Data Transfer Object "ShortenUri" should at least comprise attributes originalUri and shortenUri, and may optionally comprise one or more of optional attributes like expirationDate.

In addition, the set of API methods associated with the short URI Data Transfer Object "ShortenUri" may define as below:
ShortenUri makeShortenUri(ShortenUri shortenUri)
Description:
Create a new short URI in a Web server.
Input:
shortenUri—the request for the short URI, the mandatory property is originalUri, other optional properties are expirationDate, oneTimeAccess, exclusiveAccessors, and httpHeaders.
Output:
The new short URI. shortenUri must be returned in the short URI Data Transfer Object "ShortenUri".

It should be noted that for the method ShortenUri makeShortenUri(ShortenUri shorten Uri), "ShortenUri" represents the short URI Data Transfer Object "ShortenUri" as defined above, while "shortenUri" represents an instance of the short URI Data. Transfer Object.
ShortenUri getOriginalUri(String shortenUri, String accessor)
Description:
Get the original URI by the short URI. If the accessor is restricted by this short URI, access exception is prompted.
Input:
shortenUri—the short URI
accessor—the accessor of the short URI. This parameter is optional.
Output:
Original URI. The original URI must be returned in the short URI Data Transfer Object "ShortenUri".
boolean removeShortenUri(String shortenUri)
Description:
Remove the short URI. Only the creator and the system administrators have the permission to remove the short URIs.
Input:
shortenUri—the short URI
Output:
A boolean value indicating whether the removal is successful.

It should be understood that only the exemplary method in the set of AIP methods for enabling the Web server to consume the short URI has been defined above. According to a concrete application scenario, more methods may be defined and added to the set of AIP methods. In addition, any appropriate implementation or algorithm may be designed to implement these exemplary methods, and the scope of the present disclosure is not limited in this regard.

As described above, in the URI shortening service provided according to the embodiments of the present disclosure, content server 303 is configured to maintain metadata associated with short URIs. Content server 303 may comprise a data repository for storing metadata associated with short URIs. For example, metadata associated with short URIs may be stored in a data repository of content server 303 in the form of a database table. Tables 1 to 5 below show examples of metadata associated with short URIs, which are stored in the database table form. Note in tables 1 to 5, corresponding transfer protocol names and domain names for original URIs (original-uri) and short URIs (shorten-uri) are not shown, but only path names are shown.

TABLE 1 an active short URI which has an expiration date

| Property | Value |
| --- | --- |
| original-uri | /tenants/1b523c/spaces/02c6d/folders/9843a2f/docs/837b8 |
| shorten-uri | /s/1fb5d |
| creator | dave |
| creation-date | 2015-09-15T07:52:07.277+00:00 |
| expiration-date | 2015-09-25T08:00:00.000+00:00 |
| last-access-date | 2015-09-15T08:24:21.478+00:00 |
| access-count | 2 |
| one-time-use | False |
| forbidden-accessors | — |
| exclusive-accessors | |
| http-header-names | — |
| http-header-values | — |

TABLE 2 an expired short URI

| Property | Value |
| --- | --- |
| original-uri | /tenants/1b523c/spaces/02c6d/folders/9843a2f/docs/837b8 |
| shorten-uri | /s/1fb5d |
| creator | dave |
| creation-date | 2015-09-15T07:52:07.277+00:00 |
| expiration-date | 2015-09-25T08:00:00.000+00:00 |
| last-access-date | 2015-09-27T14:37:51.213+00:00 |
| access-count | 2 |
| one-time-use | False |
| forbidden-accessors | — |
| exclusive-accessors | |
| http-header-names | — |
| http-header-values | — |

TABLE 3 a valid one-time-user short URI

| Property | Value |
| --- | --- |
| original-uri | /tenants/1b523c/spaces/02c6d/folders/9843a2f/docs/837b8 |
| shorten-uri | /s/1fb5d |
| creator | dave |
| creation-date | 2015-09-15T07:52:07.277+00:00 |
| expiration-date | 2015-09-25T08:00:00.000+00:00 |
| last-access-date | — |
| access-count | 0 |
| one-time-use | True |
| forbidden-accessors | — |
| exclusive-accessors | |
| http-header-names | — |
| http-header-values | — |

TABLE 4 a short URI with restricted users

| Property | Value |
| --- | --- |
| original-uri | /tenants/1b523c/spaces/02c6d/folders/9843a2f/docs/837b8 |
| shorten-uri | /s/1fb5d |
| creator | dave |
| creation-date | 2015-09-15T07:52:07.277+00:00 |
| expiration-date | 2015-09-25T08:00:00.000+00:00 |
| last-access-date | 2015-09-15T08:24:21.478+00:00 |
| access-count | 2 |
| one-time-use | False |
| forbidden-accessors | Alice, Bob |
| exclusive-accessors | |
| http-header-names | — |
| http-header-values | — |

TABLE 5 a short URI with authorization header

| Property | Value |
| --- | --- |
| original-uri | /tenants/1b523c/spaces/02c6d/folders/9843a2f/docs/837b8 |
| shorten-uri | /s/1fb5d |
| creator | dave |
| creation-date | 2015-09-15T07:52:07.277+00:00 |
| expiration-date | 2015-09-25T08:00:00.000+00:00 |
| last-access-date | 2015-09-15T08:24:21.478+00:00 |
| access-count | 2 |
| one-time-use | False |
| forbidden-accessors | — |
| exclusive-accessors | |
| http-header-names | Authorization |
| http-header-values | Basic ZGF2ZTpwYXNzd29yZA== |

With reference to FIG. 3, description is presented below to interactions among client 301, Web server 302 and content server 303 in method 300.

Like method 100, in method 300, it is assumed that the user has obtained a short URI corresponding to a long URI of content resources to be accessed.

It should be understood that the user may use any appropriate means to get the short. URI. For example, with respect to the long URI, the user may register with Web server 302 to obtain the corresponding URI. For example, the user may, with respect to the long URI "http://example.com/tenants/1b523c/spaces/02c6d/folders/9843a2f/docs/837b8", register with Web server 302 and thus obtain the corresponding short URI, e.g., "http://example.com/s/1fb5d", wherein "example.com" is the name of Web server 302, i.e., the domain name of the short URI, "/s/1fb5d" is the identifier (ID) of the short URI. For another example, the user may obtain the short URI via email, webpage, etc.

After obtaining the short URI, the user may send a request for accessing content resources to Web server 302 via client 301 (e.g., Web browser) (as shown by S310), for example, GET request 3100 in the form of "GET http://example.com/s/1fb5d". As seen from GET request 3100, it includes the short URI "http://example.com/s/1fb5d" for content resources to be accessed.

In S320, in response to receiving the GET request, Web server 302 communicates with content server 303 to get metadata, associated with the short URI, in the content server. For example. Web server 302 may use the above-described short URI Data Transfer Object "ShortenUri" and the method "ShortenUri getOriginalUri(String shortenUri, String accessor)" to communicate with content server 303 for getting needed metadata.

In S330, content server 303 returns needed metadata 306 to Web server 302. For example, content server 303 may return metadata 306 in any of forms as shown in Tables 1 to 5.

In S340, Web server 302 parses metadata 306 to get the long URI corresponding to the short URI. According to the embodiments of the present disclosure, since both the long URI and its corresponding short URI are created by Web server 302, they point to Web server 302, that is, the long URI and its corresponding short. URI have the same domain name, but the character length of the long URI is longer than that of the short URI.

According to the embodiments of the present disclosure, metadata 306 returned by content server 303 may further comprise header information in the request for accessing content resources as issued using the long URI. The header information may comprise, for example, authorization information of the client, information that is specified by the client and associated with a response to the request, etc. As one example, where client 301 and. Web server 302 communicate using a HTTP protocol, the header information may comprise http header information of the http request.

Specifically, as understood by those skilled in the art, the HTTP protocol adopts a request/response model, where a client (e.g., client 301) issues a http request to a server (e.g., Web server 302), and the server gives a http response. The http request usually comprises two portions, namely a http header and a http body. The http header may comprise, for example, one or more of exemplary information shown in Table 6.

TABLE 6

| Header Name | Explanation | Example of Header Value |
| --- | --- | --- |
| Accept | Specify content type which a client can receive | Accept: text/plain, text/html |
| Accept-Charset | Character encoding set which can be accepted by a browser | Accept-Charset: iso-8859-5 |
| Accept-Encoding | Specify content compression encoding type returned by a Web server, which can be accepted by the browser | Accept-Encoding: compress, gzip |
| Accept-Language | Languages which can be accepted by the browser | Accept-Language: en, cn |
| Accept-Ranges | One or more | Accept-Ranges: bytes |

TABLE 6-continued

| Header Name | Explanation | Example of Header Value |
| --- | --- | --- |
| | sub-range fields which can request webpage entities | |
| Authorization | Authorization certificate with HTTP authorization | Authorization: Basic ZGF2ZTpwYXNzd29yZA== |
| Cache-Control | Specify cache mechanism which is followed by request and response | Cache-Control: no-cache |
| Connection | Indicate whether persistent connection is needed or not (HTTP 1.1 defaults persistent connection | Connection: close |
| Cookie | When HTTP request is sent, all cookie values saved under the request domain name will be sent together to the Web server | Cookie: $Version = 1; Skin = new; |
| Content-Length | Length of requested content | Content-Length: 348 |
| Content-Type | Requested MIMI information corresponding to entity | Content-Type: application/x-www-form-urlencoded |
| . . . | . . . | . . . |

According to the embodiments of the present disclosure, the information associated with the long URI, e.g., information in http header may be obtained while creating the corresponding short URI for the long URL. Specifically, before sending GET request 3100 to Web server 302 using the short URI, the user may first send another GET request to Web server 302 via client 301 using the longer URI. Http header of the another GET request may include one or more of the information shown in Table 6. For example, http header of the another GET request may include information shown in Table 6, with the header name of "Authorization" and with the header value of "Basic ZGF2ZTpwYXNzd29yZA==".

In response to receiving the another GET request, Web server 302 may create a short URI corresponding to a long URI in the another GET request. Specifically, while creating the short URI corresponding to the long URI, Web server 302 may generate metadata associated with the short URI and provide the generated metadata to content server 303. In addition, while generating the metadata associated with the short URI, Web server 302 may include information (e.g., information shown in Table 6, with the header name of "Authorization" and with the header value of "Basic ZGF2ZTpwYXNzd29yZA=="), associated with the long URI, into the metadata. For example, Table 5 shows an example of metadata including the information with the header name of "Authorization" and with the header value of "Basic ZGF2ZTpwYXNzd29yZA==" as shown in Table 6 above.

Since information associated with the long URI is included in advance in metadata associated with the short URI and the metadata is stored in content server 303, the information associated with the long URI does not have to be carried when sending GET request 3100 to Web server 302 using the short URI, thereby reducing the risk of leaking the information associated with the long URI and increasing the access security.

Still refer to FIG. 3. In S350, Web server 302 parses the long URI to identify content resources identified by the long URI and further identify a data object corresponding to the content resources.

In S360, Web server 302 communicates with content server 303 to get the data object. In S370, content server 303 returns the needed data object to Web server 302.

Web server 302 may construct a response to the request for content resources based on the received data object. In S380, Web server 302 returns the response to the request for content resources to client 101.

In addition, the constructing a response to the request for content resources based on the received data object may further comprise optional S390 and S3100 as shown by dotted arrows in FIG. 3.

Specifically, in S390, Web server 302 queries content server 303 for the short URI of content resources associated with to-be-accessed content resources. In some embodiments, S390 may comprises operations as below: first of all, Web server 302 parses the data object received from content server 303 to determine content resources associated with to-be-accessed content resources; then, Web server 302 identifies a link relation between the to-be-accessed content resources and the second content resources and generates a long URI of the second content resources based on the link relation; later, Web server 302 queries in content server 303 whether or not there exists a short URI corresponding to the long URI of the second content resources.

If there is a short URI corresponding to the long URI of the second content resources, content server 303 returns the short URI in S3100.

On the other hand, if no short URI corresponding to the long URI of the second content resources exists in content server 303, then Web server 302 generates a short URI corresponding to the long URI of the second content resources and creates a mapping between the long URI and the corresponding short URI so as to generate metadata (not shown in FIG. 3) associated with the short URI. Subsequently, Web server 302 may provide the metadata to content server 303 for storage.

After obtaining the short URI of the second content resources, Web server 302 may add to the data object, received from content server 303, the short URI of the to-be-accessed content resources and the short URI of the second content resources, so as to construct a response to the content resource request and return the response to client 301.

It should be understood that the description of the Web server in this disclosure is merely intended to present one example of computing device for providing access to content resources in a content server, rather than limiting the scope of this disclosure by any details in this example. Those skilled in the art may understand that any other appropriate type of computing device may further be used to implement various embodiments of the present disclosure.

In addition, it should be understood although the method for providing access to content resources has been described by way of the GET request, the scope of the embodiments of the present disclosure is not limited thereto. In fact, the method for providing access to content resources according to the embodiment of the present disclosure is also applicable to POST, PUT, DELETE requests, etc.

FIG. 4 shows an exemplary response 400 to a content resource request. In exemplary response 400, a data object in a response to document resources is represented in JavaScript Object Notation (JSON) format. Specifically, the data object in response 400 is shown to comprise four attributes: "type", "definition", "properties", and "links". For the "links" attribute, it comprises a link pointing to to-be-accessed document resources "http://example.com/s/91fy3m" (with the link relation named "self") and links pointing to second content resources "http://example.com/s/91fy3m" (with the link relation named "edit"), "http://example.com/s/84z05f" (with the link relation named "parent"), etc.

It should be understood although FIG. 4 shows a response represented using the JSON format, any other appropriate format may be used to represent responses to content resource requests, such as XML (Extensive Markup Language) format, etc. The scope of the present disclosure is not limited in this regard.

Figure 5:
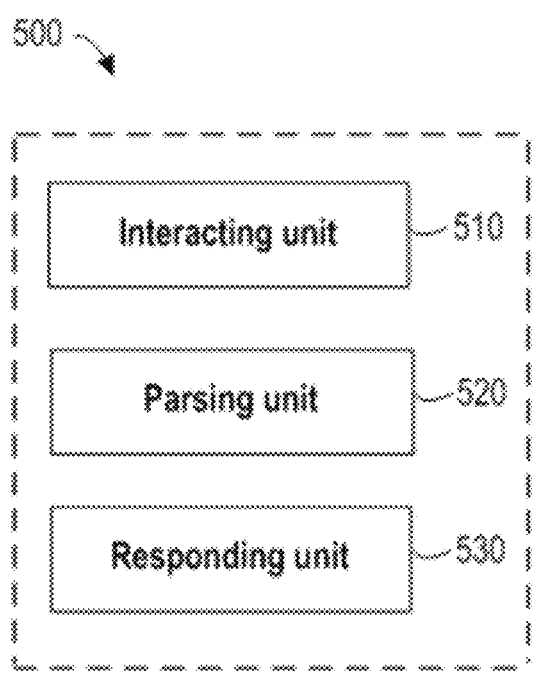
FIG. 5 shows a block diagram of an apparatus for providing access to, content resources in a content server according to an embodiment of the present disclosure.

Embodiments of the present disclosure further provide an apparatus for providing access to content resources. FIG. 5 shows a block diagram of an apparatus 500 for providing access to content resources according to an embodiment of the present disclosure. Apparatus 500 may be implemented on any appropriate server. The server may include, but not limited to, a Web server, an application server, or any other appropriate type of server. Where a Web server is adopted, the Web server may be, for example, a REST server using REST architecture.

As shown in FIG. 5, apparatus 500 comprises: an interacting unit 510 configured to obtain, in response to receiving a first request for accessing first content resources in a content server, from the content server metadata associated with a first Uniform Resource Identifier (URI) of the first content resources, the first request including the first URI, the metadata at least indicating a mapping between the first URI of the first content resources and a second URI of the first content resources, the first URI being a shortened version of the second URI; a parsing unit 520 configured to obtain the second URI by parsing the metadata; and a responding unit 530 configured to respond to the first request with the second URI of the first content resources.

In some embodiments, the second URI has the same domain name as the first URI.

In some embodiments, interacting unit 510 is further configured to receive a second request for accessing the first content resources before receiving the first request, the second request including the second URI; and wherein, the apparatus 500 further comprises: a creating unit configured to generate the metadata associated with the first URI by creating the mapping between the first URI and the second URI.

In some embodiments, the second request includes header information, and the creating unit is further configured to: extract the header information from the second request; and include the header information in the metadata.

In some embodiments, responding unit 530 is further configured to: identify the first content resources by parsing the second URI; identify a data object associated with the first content resources; and obtain the data object from the content server.

In some embodiments, responding unit 530 is further configured to: determine second content resources associated with the first content resources by parsing the data object; and identify link relation between the first content resources and the second content resources; and the creating unit is further configured to: generate a first URI of the second content resources based on the link relation; and determine a second URI of the second content resources based on the first URI of the second content resources, the second URI of the second content resources being a shortened version of the first URI of the second content resources.

In some embodiments, the creating unit is further configured to make a query, with the first URI of the second content resources, to the content server for the second URI of the second content resources.

In some embodiments, the creating unit is further configured to obtain the second URI of the second content resources from the content server if there is the second URI of the second content resources in the content server.

In some embodiments, the creating unit is further configured to: create a mapping between the first URI of the second content resources and the second URI of the second content resources if there is not the second URI of the second content resources in the content server; and generate metadata associated with the second URI of the second content resources based on the mapping between the first URI of the second content resources and the second URI of the second content resources.

In some embodiments, responding unit 530 is further configured to: construct a response to the request by adding to the data object the first URI of the content resources and the first URI of the second content resources.

Figure 6:
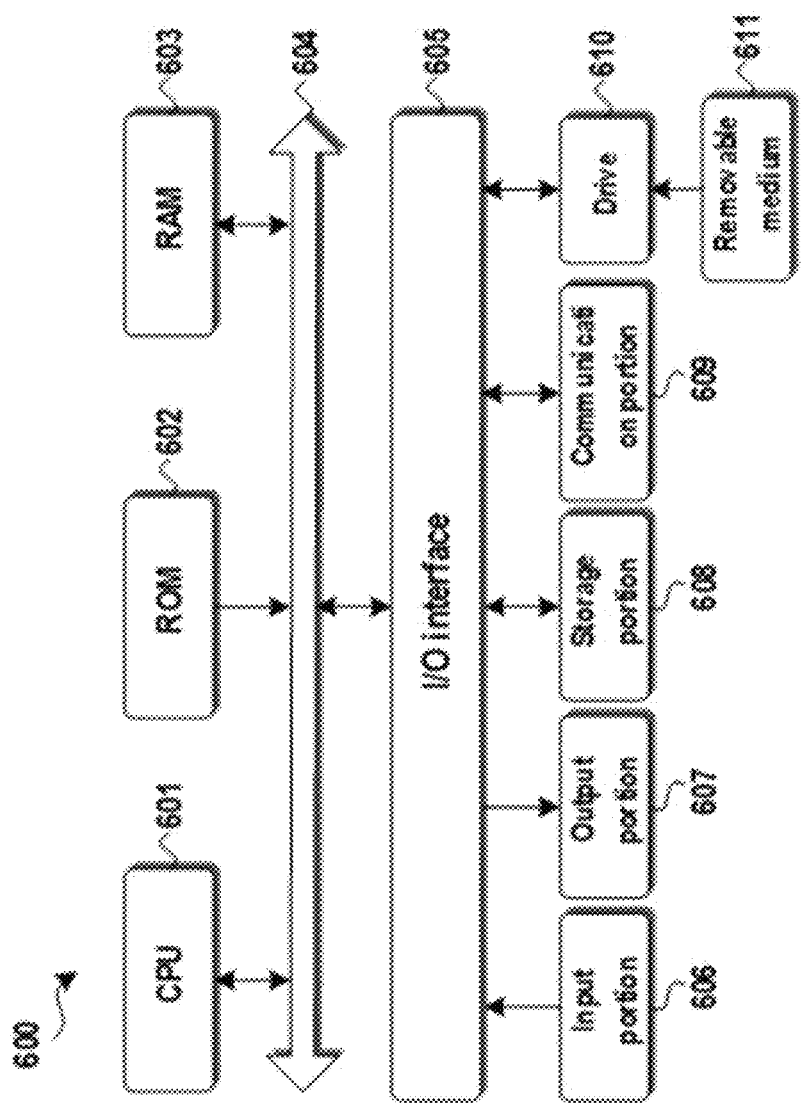
FIG. 6 shows a schematic block diagram of an exemplary computer system which is applicable to implement the embodiments of the present disclosure.

FIG. 6 shows a schematic block diagram of a computer system suitable for implementing the embodiments of the present disclosure.

With reference to FIG. 6 below, there is shown a schematic block diagram of an example computer system 600 suitable for implementing the embodiments of the present disclosure. As shown, computer system 600 comprises a central processing unit (CPU) 601 which is capable of performing various processes in accordance with a program stored in a read only memory (ROM) 602 or a program loaded from a storage unit 608 to a random access memory (RAM) 603. In RAM 603, data required when CPU 601 performs the various processes or the like is also stored as required. CPU 601, ROM 602 and RAM 603 are connected to one another via a bus 604. An input/output (I/O) interface 605 is also connected to bus 604.

The following components are connected to I/O interface 605: an input unit 606 including a keyboard, a mouse, or the like; an output unit 607 including a display such as a cathode ray tube (CRT), a liquid crystal display (LCD), or the like, and a loudspeaker or the like; storage unit 608 including a hard disk or the like; and a communication unit 609 including a network interface card such as a LAN card, a modem, or the like. Communication unit 609 performs a communication process via the network such as the internee. A drive 610 is also connected to I/O interface 605 as required. A removable medium 611, such as a magnetic disk, an optical disk, a magneto-optical disk, a semiconductor memory, or the like, is mounted on drive 610 as required, so that a computer program read therefrom is installed into storage unit 608 as required.

Specifically, in accordance with example embodiments of the present disclosure, the processes described with reference to FIGS. 2 and 3 above may be implemented as computer software programs. For example, embodiments of the present disclosure comprise a computer program product including a computer program tangibly embodied on a machine readable medium, the computer program including program code for performing methods 200 and 300.

Generally, various example embodiments of the present, disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of the example embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

Additionally, various blocks shown in the flowcharts may be viewed as method steps, and/or as operations that result from operation of computer program code, and/or as a plurality of coupled logic circuit elements constructed to carry out the associated function(s). For example, embodiments of the present disclosure include a computer program product comprising a computer program tangibly embodied on a machine readable medium, the computer program including program codes configured to carry out the methods as described above.

In the context of the disclosure, a machine readable medium may be any tangible medium that may include, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods of the present disclosure may be written in any combination of one or more programming languages. These computer program codes may be provided to a processor of a general purpose computer, special purpose computer, or other programmable data processing apparatus, such that the program codes, when executed by the processor of the computer or other programmable data processing apparatus, cause the functions/operations specified in the flowcharts and/or block diagrams to be implemented. The program code may execute entirely on a computer, partly on the computer, as a stand-alone software package, partly on the computer and partly on a remote computer or entirely on the remote computer or server.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are included in the above discussions, these should not be construed as limitations on the scope of any disclosure or of what may be claimed, but rather as descriptions of features that may be specific to particular embodiments of particular disclosures. Certain features that are described in this specification in the context of separate embodiments may also be implemented in combination in a single embodiment. Conversely, various features that are described in the context of a single embodiment may also be implemented in multiple embodiments separately or in any suitable sub-combination.

Various modifications, adaptations to the foregoing example embodiments of this disclosure may become apparent to those skilled in the relevant arts in view of the foregoing description, when read in conjunction with the accompanying drawings. Any and all modifications will still fall within the scope of the non-limiting and example embodiments of this disclosure. Furthermore, other embodiments of the disclosures set forth herein will come to mind to one skilled in the art to which these embodiments of the disclosure pertain having the benefit of the teachings presented in the foregoing descriptions and the drawings.

It will be appreciated that the embodiments of the present disclosure are not to be limited to the specific embodiments as discussed above and that modifications and other embodiments are intended to be included within the scope of the appended claims. Although specific terms are used herein, they are used in a generic and descriptive sense only and not for purposes of limitation.

We claim:

1. A method for providing access to content resources, comprising:
   in response to receiving a first request for accessing first content resources that are stored on a content server, obtaining, from the content server, metadata associated with a first Uniform Resource Identifier (URI) of the first content resources, the first request including the first URI, the metadata at least indicating a mapping between the first URI of the first content resources and a second URI of the first content resources, the first URI being a shortened version of the second URI, the second URI having a same hostname as the first URI;
   obtaining the second URI by parsing the metadata; and
   responding to the first request with the second URI of the first content resources by:

identifying the first content resources by parsing the second URI;
identifying a data object associated with the first content resources;
obtaining the data object from the content server;
determining second content resources associated with the first content resources by parsing the data object;
identifying a link relation between the first content resources and the second content resources;
generating a third URI of the second content resources based on the link relation; and
determining a fourth URI of the second content resources based on the third URI of the second content resources, the fourth URI of the second content resources being a shortened version of the third URI of the second content resources.

2. The method according to claim 1, further comprising:
before receiving the first request,
receiving a second request for accessing the first content resources, the second request including the second URI; and
in response to receiving the second request, generating the metadata associated with the first URI by creating the mapping between the first URI and the second URI.

3. The method according to claim 2, wherein the second request includes header information, and wherein the generating the metadata associated with the first URI comprises:
extracting the header information from the second request; and
including the header information in the metadata.

4. The method according to claim 1, wherein the determining the fourth URI of the second content resources comprises:
making a query, with the third URI of the second content resources, to the content server for the fourth URI of the second content resources.

5. The method according to claim 4, wherein the determining the fourth URI of the second content resources further comprises:
obtaining the fourth URI of the second content resources from the content server if there is the fourth URI of the second content resources in the content server.

6. The method according to claim 4, wherein the determining the fourth URI of the second content resources further comprises:
creating a mapping between the third URI of the second content resources and the fourth URI of the second content resources if there is not the fourth URI of the second content resources in the content server; and
generating metadata associated with the fourth URI of the second content resources based on the mapping between the third URI of the second content resources and the fourth URI of the second content resources.

7. The method according to claim 6, wherein the responding to the first request with the second URI of the first content resources further comprises:
constructing a response to the first request by adding to the data object the first URI of the first content resources and the fourth URI of the second content resources.

8. The method according to claim 1 wherein the first request includes one of a PUT, POST, and DELETE request.

9. The method according to claim 1 wherein the method is performed by a web server, the web server being in communication with the content server over a local network.

10. The method according to claim 1, wherein the responding to the first request with the second URI of the first content resources further comprises:
constructing a response to the first request based on the obtained data object; and
returning the constructed response to a client.

11. An apparatus for providing access to content resources, comprising:
an interacting unit configured to obtain from a content server, in response to receiving a first request for accessing first content resources that are stored on the content server, metadata associated with a first Uniform Resource Identifier (URI) of the first content resources, the first request including the first URI, the metadata at least indicating a mapping between the first URI of the first content resources and a second URI of the first content resources, the first URI being a shortened version of the second URI;
a parsing unit configured to obtain the second URI by parsing the metadata;
a responding unit configured to respond to the first request with the second URI of the first content resources, wherein the responding unit is further configured to:
identify the first content resources by parsing the second URI;
identify a data object associated with the first content resources;
obtain the data object from the content server;
determine second content resources associated with the first content resources by parsing the data object; and
identify a link relation between the first content resources and the second content resources; and
a creating unit configured to:
generate a third URI of the second content resources based on the link relation; and
determine a fourth URI of the second content resources based on the third URI of the second content resources, the fourth URI of the second content resources being a shortened version of the third URI of the second content resources.

12. The apparatus according to claim 11,
wherein the interacting unit is further configured to receive a second request for accessing the first content resources before receiving the first request, the second request including the second URI; and
wherein the creating unit is further configured to, in response to receiving the second request, generate the metadata associated with the first URI by creating the mapping between the first URI and the second URI.

13. The apparatus according to claim 12, wherein the second request includes header information, and the creating unit is further configured to:
extract the header information from the second request; and
include the header information in the metadata.

14. The apparatus according to claim 11, wherein the creating unit is further configured to:
make a query, with the third URI of the second content resources, to the content server for the fourth URI of the second content resources.

15. The apparatus according to claim 14, wherein the creating unit is further configured to:
obtain the fourth URI of the second content resources from the content server if there is the fourth URI of the second content resources in the content server.

16. The apparatus according to claim 14, wherein the creating unit is further configured to:

create a mapping between the third URI of the second content resources and the fourth URI of the second content resources if there is not the fourth URI of the second content resources in the content server; and
generate metadata associated with the fourth URI of the second content resources based on the mapping between the third URI of the second content resources and the fourth URI of the second content resources.

* * * * *